June 16, 1931.  A. E. BRUNS  1,810,594
DUSTPROOF CASING FOR SPOOLS OR OTHER ARTICLES
Filed June 29, 1928
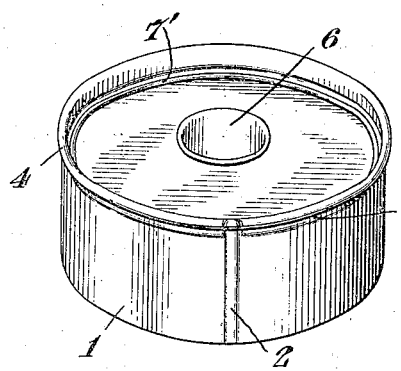
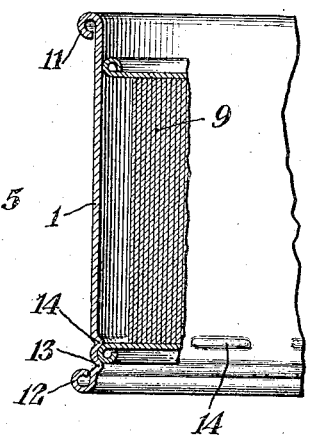
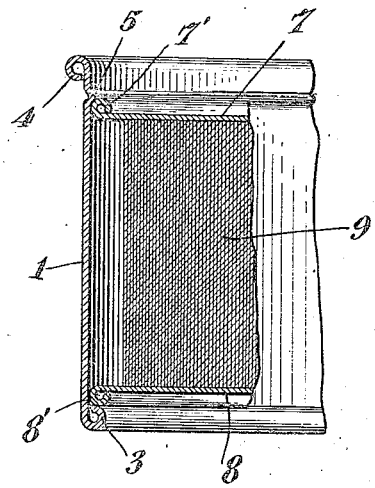
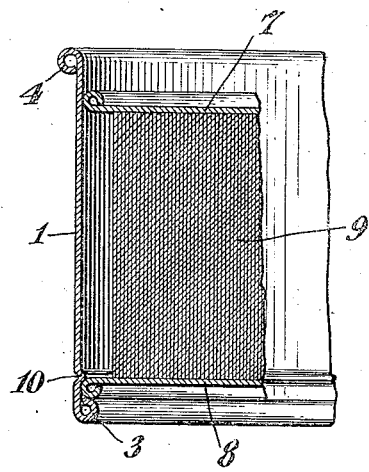
Inventor
Alfred E. Bruns
By his Attorneys
Townsend + Decker Patented June 16, 1931

1,810,594

UNITED STATES PATENT OFFICE

ALFRED E. BRUNS, OF HUNTINGTON, NEW YORK, ASSIGNOR, BY MESNE ASSIGNMENTS, TO JOHNSON & JOHNSON, OF NEW BRUNSWICK, NEW JERSEY, A CORPORATION OF NEW JERSEY

DUSTPROOF CASING FOR SPOOLS OR OTHER ARTICLES

Application filed June 29, 1928. Serial No. 289,140.

This invention has for its object the production of a simple and inexpensive casing for a reel or other object adapted to have adhesive tape or any other ribbons of lengths of material wound thereon whereby the tape will be protected from dust or damage.

A further object of the invention is the production of a casing of the above character which shall contain quickly detachable locking means for holding the reel in position.

Other and further objects and advantages will appear from the accompanying description, the invention consisting in the novel casing and reel therefor hereinafter more particularly described and then specified in the claims.

In the accompanying drawings illustrating a practical embodiment of the invention:

Fig. 1 is a perspective view of the casing with the reel in proper position inserted therein.

Fig. 2 is a fragmentary section taken through the reel and casing.

Fig. 3 is a view similar to Fig. 2 but showing a modification.

Fig. 4 is a similar view showing a further modification.

Referring in detail to the drawings:

The body 1 of the casing or container is preferably made cylindrical or in the form of a drum and is open at both ends. The particular shape in cross-section may of course be varied without departing from my invention. Said casing is also preferably made of sheet metal and may be constructed in any desired way known in sheet metal working, as for instance by taking a strip of metal and joining its ends together by a conventional form of outside seam 2 whereby the inner surface presents a smooth appearance. At or near one edge of said open-ended container or casing there is provided a suitable stop made by bending or otherwise forming the metal thereof and cooperating with the reel or spool when inserted into the drum as will be presently described, to limit the movement of insertion of the spool into the drum. As a convenient way of forming said stop one edge of said strip or casing is curled inwardly on itself forming a bead 3 which acts as the stop while the other edge may be curled outwardly on itself forming a bead 4 to present a smooth edge. At some convenient point on the interior of the casing or drum there is provided a catch adapted to automatically engage the reel or spool when fully inserted endwise in said casing to hold the same against accidental removal. Such catch may be provided, as illustrated in Fig. 2, by means of an inwardly pressed bead or indentation 5 in the material of which the casing is formed and preferably but not necessarily extending completely around the casing. Said catch in the form of the invention shown in Fig. 2 is near or at the open end into which the reel or spool is inserted but, as will be presently described, might be at the opposite end being in such instance properly located to engage with the entering end of the spool or reel.

6 indicates the hub or drum of a reel or spool the ends of which are provided in any desired manner with the side members 7 and 8 respectively constituting the heads or flanges of the spool and preferably comprising sheet metal disks whose edges are turned or curled over to form beads as at 7′ and 8′ respectively so that the edges shall present smooth surfaces. Wound on the hub or drum 6 is a length of adhesive tape or other material and indicated at 9.

When the reel is inserted axially within the casing and is fully entered therein in proper position it will be observed that the bead 7′ engages the bead 5 on the casing which acts as a locking or retaining member to prevent the reel from falling from within the casing in one direction while the bead 3 on the casing acts as a stop to prevent the reel from falling from within the casing in the other direction. In this operation the edge of the flange or head springs or snaps automatically by the catch formed by the bead or indentation 5 by a spring action. To remove the reel it is merely necessary to press against the face of the side member or disk 8 whereupon the pressure of the bead 7′ against the bead 5 will cause the strip 1 to expand slightly at that side of the strip and permit the reel to ride safely past the bead 5 whereupon the reel may be removed from the casing after which the ring will resume its normal position. Conversely, to insert the reel in the casing the beads 7' and 8' are forced past the bead 5 to expand the ring and when the reel has been fully inserted in the casing the ring will again assume its normal position and the bead 5 will then again act as a retaining member to retain the reel in position.

In practice it may be desirable to make the circumference of the disk 8 slightly less than the normal inner circumference of the bead 5 so that said disk will ride safely past the bead 5 without making it necessary to expand the ring, the diameter of the disk 7 however, as is obvious, being slightly greater than the normal non-expanded inner circumference of the bead 5.

Obviously, however, this is not necessary. If, as is desirable, the diameter of both heads of the spool or reel is the same which is the case in the preferred form of the invention and as illustrated, the locking effect of the catch after full insertion of the reel will be attained no matter which end of the reel is first inserted.

In the modification illustrated in Fig. 3 instead of locating the locking bead or indentation at the entering end of the casing 1 to be engaged by the head of the spool last entering the casing, I locate the inwardly pressed bead or locking member near the opposite end of the drum or casing, and as indicated at 10, so that it will be slightly expanded and will engage with and lock upon the entering end of the spool or reel when the same is inserted in position and said entering end is forced over said bead or indentation by the pressure applied to the reel but which thereafter acts as a retaining means to retain the reel in position within the casing.

In the modification illustrated in Fig. 4 both the upper and lower edges of the casing are curled over on themselves as shown at 11 and 12. The casing is also provided with an inwardly pressed bead 13 adjacent the edge 12 forming a stop member and with a series of inwardly pressed beads 14 one or more of which may be omitted and which have the same function as the bead 10 of the modification of Fig. 3.

From the above explanation it will be obvious that I have produced a simple form of casing very conveniently used and of exceedingly cheap construction which effectively acts to hold the reel therein and which by reason of the fact that it will permit the edges of the heads or flanges of the spool to fit within it will prevent dust from contacting with the material wound on the reel and will prevent injury to said material. The reel may also be easily snapped into position within the casing or removed therefrom with equal facility by slight pressure applied against the entering end in a direction opposite that applied to snap the reel into position.

I claim as my invention:

1. The combination of a casing or container open at both ends and adapted to receive and hold a reel or spool when inserted axially therein, a stop for limiting the motion of insertion when the reel or spool is fully inserted and engaged by the spool head and an element with which a spool head automatically engages when fully inserted to prevent accidental removal.

2. The combination of an open-ended drum, a spool adapted to be inserted in said drum axially, a bead or flange on one of said members adapted to limit the motion of insertion and an element adapted to engage over the edge of the spool head and prevent its accidental removal when the spool is fully inserted, and at the same time permitting it to be ejected by force applied to the entering end.

3. The combination of a casing or container open at both ends and adapted to receive and hold a reel or spool when inserted axially therein, a stop for limiting the motion of insertion when the reel or spool is fully inserted and engaged by the spool head, and means with which a spool head automatically engages when fully inserted to prevent accidental removal, and consisting of an inwardly extending struck-up projection ertending from the body of the casing and adapted to snap over the edge of the spool when the same is forced into the drum.

4. An article of manufacture comprising a casing formed of sheet metal, a stop at one edge thereof, a retaining member thereon pressed inwardly from the metal adjacent an edge thereof and a reel for insertion in said casing comprising a drum and a flange connected thereto whose diameter is such as to permit it to engage against said retaining member when said reel is inserted within or removed from said casing.

5. An article of manufacture comprising a casing formed of sheet metal, a bead on one edge thereof forming a stop, a bead pressed inwardly from the metal of said casing and forming a retaining member and a reel for insertion within said casing comprising a drum and side members forming flanges of the ends thereof, the diameter of one of said side members being such as to permit it to engage said retaining member and expand said casing when said reel is inserted within or removed from said casing.

6. A reel casing or container consisting of a hollow cylindrical body open at both ends and adapted to be sealed at both ends by the heads or flanges of the reel when the same is inserted axially therein, an inwardly projecting member on the container adapted to catch under an edge of the head when the spool is fully inserted and prevent accidental withdrawal and a bead on one of said elements acting to limit the movement of insertion.

7. A spool and cage assembly, comprising a standard spool having resilient end flanges, a separable cage consisting of a ring to bridge the gap between the flanges, said ring having metal displaced radially thereof normally to bar passage of the spool, which metal displacements are overcome by snap action of the proximate end flange, said ring having an inwardly directed shoulder which constitutes an end stop for the spool.

8. As a new article of manufacture, a spool holder consisting of a drum or hollow cylinder open at both ends and provided with a bead adapted to be engaged by a head of the spool and limit the insertion of the spool axially therein and with means on its inner side adapted to automatically engage a head of the spool to hold the same in position when fully inserted.

Signed at New York, in the county of New York and State of New York, this 27th day of June, A. D. 1928.

ALFRED E. BRUNS.